US012420288B2

(12) United States Patent
Olympios

(10) Patent No.: US 12,420,288 B2
(45) Date of Patent: Sep. 23, 2025

(54) DEVICE AND METHOD FOR RECYCLING BUILDING MATERIAL

(71) Applicant: Hydro-Mineral Recycling GmbH & Co. KG, Duisburg (DE)

(72) Inventor: Grigorios Olympios, Bochum (DE)

(73) Assignee: Hydro-Mineral Recycling GmbH & Co. KG, Duisburg (DE)

( * ) Notice: Subject to any disclaimer, the term of this patent is extended or adjusted under 35 U.S.C. 154(b) by 80 days.

(21) Appl. No.: 18/283,247

(22) PCT Filed: Mar. 22, 2022

(86) PCT No.: PCT/EP2022/057421

§ 371 (c)(1),
(2) Date: Apr. 19, 2024

(87) PCT Pub. No.: WO2022/200308

PCT Pub. Date: Sep. 29, 2022

(65) Prior Publication Data

US 2024/0269688 A1 Aug. 15, 2024

(30) Foreign Application Priority Data

Mar. 22, 2021 (DE) ..................... 10 2021 106 974.2
Apr. 19, 2021 (DE) ..................... 10 2021 109 813.0

(51) Int. Cl.
*B03B 5/72* (2006.01)
*B03B 9/06* (2006.01)

(52) U.S. Cl.
CPC ................ *B03B 5/72* (2013.01); *B03B 9/065* (2013.01)

(58) Field of Classification Search
CPC .............. B03B 5/72; B03B 9/065; B03B 5/00
See application file for complete search history.

(56) References Cited

U.S. PATENT DOCUMENTS 4,359,381 A 11/1982 Jinno
2009/0057206 A1 * 3/2009 Larson .................. B07B 1/4663 209/401

FOREIGN PATENT DOCUMENTS

DE 4120613 3/1992
JP 2003-073156 3/2003
JP 2002-136889 5/2014

OTHER PUBLICATIONS

Internationaler Recherchenbericht und Schriftlicher Bescheid [International Search Report and the Written Opinion] Dated Aug. 10, 2022 From the International Searching Authority Re. Application No. PCT/EP2022/057421. (12 Pages).
Prüfungsbescheid [Examination Report] Dated Nov. 5, 2021 From the Deutsches Patent - und Markenamt [German Patent and Trademark Office] Re. Application No. 102021109813.0. (5 Pages).

* cited by examiner

*Primary Examiner* — Jacob S. Scott
*Assistant Examiner* — Miraj T. Patel

(57) ABSTRACT

The disclosure relates to a device (1) for recycling building material (2), which contains a base material and a binder, with a receiving container (3, 3*a*, 3*b*) for the building material (2), wherein the building material (2) in the receiving container (3, 3*a*, 3*b*) can be acted upon by at least one nozzle (4) with a high-pressure water jet (5) for detaching the binder from the base material. Furthermore, the disclosure relates to a method for recycling building material (2).

17 Claims, 13 Drawing Sheets

DEVICE AND METHOD FOR RECYCLING BUILDING MATERIAL

RELATED APPLICATIONS

This application is a National Phase of PCT Patent Application No. PCT/EP2022/057421 having International filing date of Mar. 22, 2022, which claims the benefit of priority of German Patent Application Nos. 10 2021 109 813.0 filed on Apr. 19, 2021 and 10 2021 106 974.2 filed on Mar. 22, 2021. The contents of the above applications are all incorporated by reference as if fully set forth herein in their entirety.

FIELD AND BACKGROUND OF THE INVENTION

The disclosure relates to a device for recycling building material, for example milled asphalt pavement or road pavement or concrete or foundry sand, which contains a base material, for example rock grains, and a binder, for example adhering bitumen or tar or cement or iron, with a receiving container for the building material. Furthermore, the disclosure relates to a method for recycling building material.

A corresponding device is known, for example, from U.S. Pat. No. 4,359,381 A. In this device, milled asphalt pavement (milled material resulting from asphalt rehabilitation) containing rock grains and adhering bitumen is sprayed with hot water in a receiving container to detach the bitumen from the rock grains. The process described is very uneconomical because the device requires a lot of energy for heating the water, which is only partially available for detaching the bitumen from the rock grains when the hot water is sprayed on, already due to convection.

SUMMARY OF THE INVENTION

The disclosure relates to a device for recycling building material, for example milled asphalt pavement or road pavement or concrete or foundry sand, which contains a base material, for example rock grains, and a binder, for example adhering bitumen or tar or cement or iron, with a receiving container for the building material. Furthermore, the disclosure relates to a method for recycling building material.

DESCRIPTION OF SPECIFIC EMBODIMENTS

Figure 1:
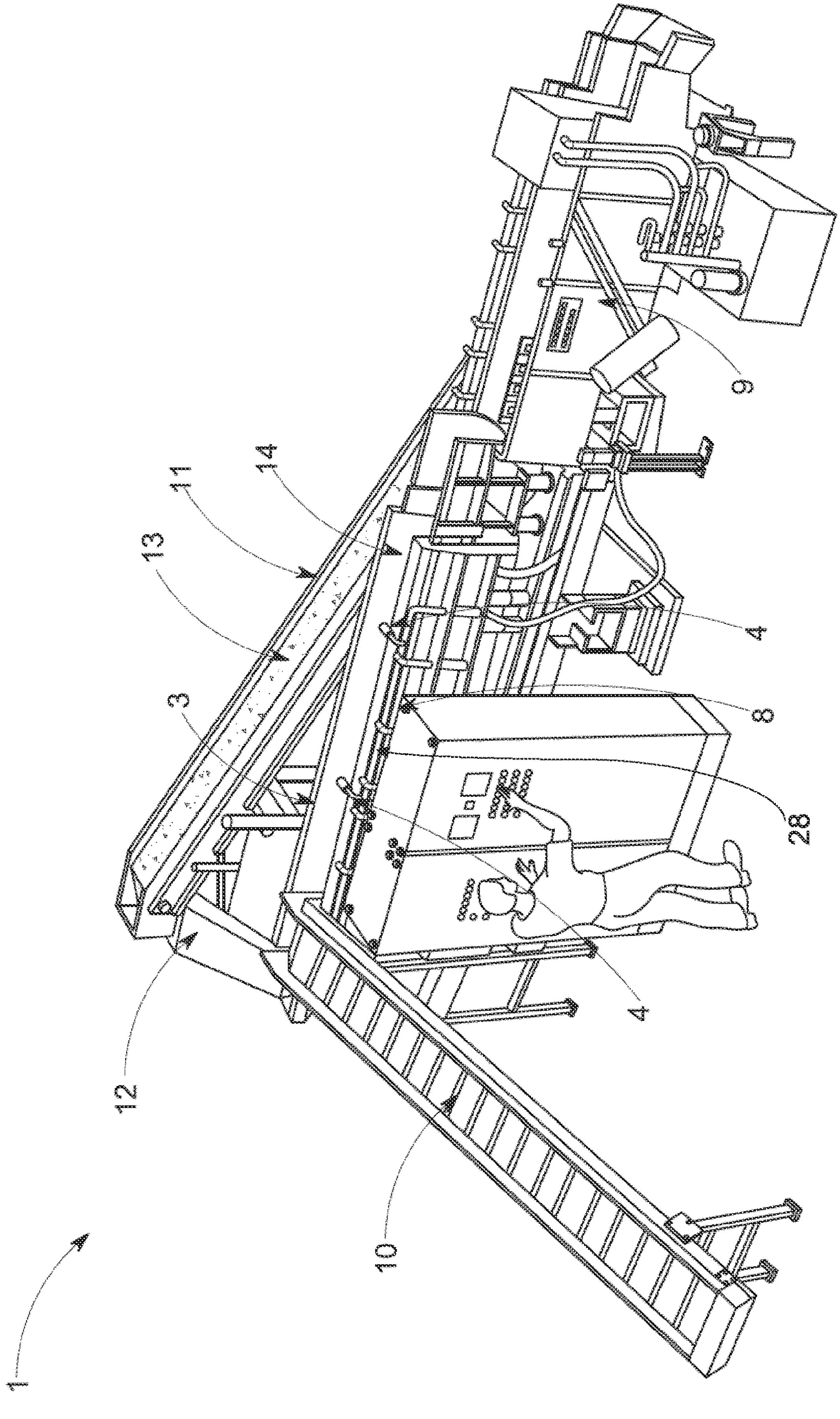
FIG. 1 shows a device according to the disclosure.

The disclosure relates to a device for recycling building material, for example milled asphalt pavement or road pavement or concrete or foundry sand, which contains a base material, for example rock grains, and a binder, for example adhering bitumen or tar or cement or iron, with a receiving container for the building material, wherein the building material in the receiving container can be acted upon by a high-pressure water jet through at least one nozzle for detaching binder from the base material.

The fact that the building material in the receiving container can be acted upon by at least one nozzle with a high-pressure water jet for detaching the binder from the base material enables the binder to be detached from the base material efficiently. The acting upon the building material in the receiving container with a high-pressure water jet provided via at least one nozzle of the device enables efficient recycling of the base material, since energy-saving detachment of the binder from the base material is possible via the high-pressure water jet on the building material in the receiving container. The high pressure of the water jet at the nozzle accelerates the water to a high velocity with which the water hits the building material in the receiving container. Via the impact energy the binder is very effectively separated from the base material. This allows the surfaces of the base material to be freed from even the most stubborn binder adhesions without further crushing or destroying the base material. One aspect is the impact of the water on the surface of the base material granulation. Another aspect is that the water level in the receiving container is increased with the added water quantities. The water added here with pressure creates a water vortex, which results in friction, causing the binder to be detached from the base material. In addition, holding the building material in the receiving container prevents separated base material or removed binder from contaminating the surroundings, since otherwise the impact of the high-pressure water jet on the granular building material would lead to an acceleration of the grains into the surroundings. The receiving container is for example open at the top and the at least one nozzle for example can be acted upon the building material from above with a high-pressure water jet directed into the receiving container.

With the device according to the disclosure, asphalt pavement as building material in the receiving container may be acted upon by at least one nozzle with a high-pressure water jet for detaching the bitumen as binder from the rock grains as base material. This allows the bitumen to be detached from the rock grains efficiently. The impingement of the milled asphalt pavement in the receiving container with a high-pressure water jet provided via at least one nozzle of the device enables efficient recycling of the rock grains, since energy-saving detachment of the bitumen from the rock grains is possible via the high-pressure water jet on the milled asphalt pavement in the receiving container. The high pressure of the water jet at the nozzle accelerates the water to a high velocity with which the water hits the milled asphalt pavement in the receiving container. The impact energy very effectively separates the bitumen from the rock grains. This allows the surfaces of the rock grains to be freed from even the most stubborn bitumen adhesions.

The device according to the disclosure may also be used for recycling milled-off road pavement containing tar. In this case, the road pavement as building material is acted upon by a high-pressure water jet in the receiving container through at least one nozzle to detach the tar as binder from the rock grains as base material. This allows the tar to be efficiently detached from the rock grains. The impingement of a high-pressure water jet provided via at least one nozzle of the device on the road pavement containing tar in the receiving container enables efficient recycling of the rock grains, since energy-saving detachment of the tar from the rock grains is possible via the high-pressure water jet on the road pavement in the receiving container. The high pressure of the water jet at the nozzle accelerates the water to a high velocity with which the water hits the road pavement in the receiving container. Via the impact energy the tar is very effectively separated from the rock grains. This allows the surfaces of the rock grains to be freed from even the most stubborn tar adhesions.

The device according to the disclosure is also suitable for recycling hardened concrete or concrete rubble. This building material may be acted upon in the receiving container by at least one nozzle with a high-pressure water jet for detaching the cement as binder from the rock grains as base material. This allows the cement to be efficiently detached from the rock grains. The impingement of the concrete rubble in the receiving container with a high-pressure water jet provided via at least one nozzle of the device enables efficient recycling of the rock grains, since energy-saving detachment of the cement from the rock grains is possible via the high-pressure water jet on the concrete rubble in the receiving container. The high pressure of the water jet at the nozzle accelerates the water to a high velocity with which the water hits the concrete rubble in the receiving container. Via the impact energy the cement is separated from the rock grains very effectively. This allows the surfaces of the rock grains to be freed from even the most stubborn cement adhesions.

The device according to the disclosure may also be used to recycle foundry sand. This building material in the receiving container may be acted upon by a high-pressure water jet through at least one nozzle to detach binders and adhering iron from the sand as the base material. In this way, binders and iron can be efficiently detached from the rock grains of the sand. The impingement of the foundry sand in the receiving container with a high-pressure water jet provided via at least one nozzle of the device enables efficient recycling of the rock grains, since energy-saving detachment of the binders and iron from the rock grains is possible via the high-pressure water jet on the foundry sand in the receiving container. The high pressure of the water jet at the nozzle accelerates the water to a high velocity with which the water hits the foundry sand in the receiving container. The impact energy very effectively separates the binder and iron from the rock grains of the quartz sand. As a result, the surfaces of the rock grains can be freed from even the most stubborn binder and iron adhesions. This allows the silica sand used in the foundry to be washed clean again.

Embodiments and further developments result from the dependent claims. It should be noted that the features listed individually in the claims can also be combined with one another in any desired and technologically useful manner and thus reveal further embodiments of the disclosure.

According to an advantageous-embodiment of the disclosure, it is provided that the high-pressure water jet has a water pressure at the nozzle of more than 1000 bar, for example 1000 to 5000 bar, further for example 1000 to 3000 bar. With such a high pressure at the nozzle, the water can be sufficiently accelerated to detach adhering binder from the base material. The higher the pressure, the greater the velocity of the water exiting the nozzle. From a water pressure of 1000 bar, the water contains sufficient energy to dissolve bitumen from the rock grains, for example, but without shattering the rock grains.

An embodiment is one that provides for at least one actuator to be arranged on the receiving container, which is designed to set the building material in motion while simultaneously being acted upon by the high-pressure water jet. By the movement of the building material, the high-pressure water jet may impinge on the entire material, for example milled material or debris, in the receiving container to detach binder from the base material. With the movement, the building material in the receiving container can be easily circulated so that the high-pressure water jet can act upon the entire contents of the receiving container with accelerated water to detach, for example, the bitumen from the rock grains. The movement of the building material in the receiving container provides loosening of the entire material, so that the impingement of the high-pressure water jet does not result in any centrifugal movement of the building material from the receiving container, which is open at the top. The high-pressure water jet for example generates a water vortex in the impacted area, so that the frictional energy of the water detachs the adhering binder, for example in the finest range, for example with a grain size <0.063 mm-2.00 mm.

An embodiment of the disclosure relates to the high pressure water jet of the at least one nozzle being oriented to assist the movement of the building material. By arranging the nozzle in such a way that the movement of the building material is assisted, the circulation of the contents in the receiving container can be assisted by the water power of the high pressure water jet. Part of the energy of the water jet is converted into kinetic energy of the base material. The base material grains in the receiving container collide with each other in the process. Due to the abrasive interaction of the base material grains with each other, the detachment of the binder is considerably enhanced. However, this results in a high degree of grain fragmentation. Therefore, the high frictional energy of the water from the high-pressure water jet should be used primarily to detach the adhering binder.

An embodiment of the disclosure provides that the actuator is designed to set the receiving container in motion by means of imbalance, wherein the movement of the receiving container in combination with the high-pressure water jet is designed to fluidize the building material received in the receiving container and to set it in a vortex-like, for example circulating, motion. The movement of the receiving container by means of imbalance is very simple if the receiving container is spring-mounted. In combination with the high-pressure water jet, the building material received in the receiving container may be moved very easily like a fluid, so that the high-pressure water jet of the nozzle may be acted upon the entire base material with accelerated water. In this way, binder adhering to the received building material can be separated from the base material, because all the received base material grains are for example acted upon with the high-pressure water jet via the circulating movement. At the same time, the detachment of the binder is accelerated by the mutual collision of the base material grains of the fluidized building material. However, this leads to high grain fragmentation, so the high frictional energy of the water from the high-pressure water jet is to be used primarily to dissolve the binder. The building material received in the receiving container is for example fluidized and set into a vortex-like, for example circulating, motion. The base material grains are thus moved through a forming water vortex and cleaned by means of water friction.

An embodiment of the disclosure provides that the receiving container is designed as a trough-shaped throughput vibrator. The design of the receiving container as a trough-shaped throughput vibrator offers the possibility to recycle building material in passes through the receiving container. Depending on the proportion of binder adhering to the base material, one or more passes through the receiving container may be necessary, for example, to process the milled asphalt pavement and to separate the adhering bitumen as completely as possible from the rock grains.

An embodiment is one in which the trough-shaped throughput vibrator is designed to trigger a trowalizing movement of the building material in the receiving container. The trowalizing movement of the building material makes it easy to apply the high-pressure water jet to the entire material in the receiving container as it passes through. The high-pressure water jet may thus very easily act upon the entire material contained in the receiving container with accelerated water. The trowalizing movement is well suited to produce abrasion, i.e. an internal grinding effect in the bulk building material to detach the binder. The trowalizing movement is well suited because the bar-shaped water jet creates a water vortex in the area that occurs, which is constant, so that the moving material has to move through this vortex again and again and abrasion can thus be realized for example in the fine material.

An embodiment provides that the high-pressure water jet of at least one nozzle is directed in such a way that the trowalizing movement of the building material is supported by water force. By supporting the trowalizing movement, the entire building material contained in the receiving container can be acted upon by the high-pressure water jet, whereby the water force of the high-pressure water jet additionally accelerates the trowalizing movement of the base material and the adhering binder. This results in an effective circulation of the building material contained in the receiving container. The energy of the water is optimally introduced into the bulk building material to detach the binder.

According to an embodiment of the disclosure, it is provided that a plurality of nozzles are arranged along the trough-shaped throughput vibrator, which support the trowalizing movement of the building material along the trough-shaped throughput vibrator by water power. By means of several nozzles along the trough-shaped throughput vibrator, several high-pressure water jets may support the trowalizing circulation movement of the building material along the entire length of the throughput vibrator. For this purpose, the spacing of the nozzles can be selected so that the combined high-pressure water jets of the nozzles form a continuous water jet wall. This allows adhering binder to be separated from the rock grains along the entire length of the throughput vibrator. The material can be recycled effectively by means of the trowalizing movement along the entire length of the trough-shaped receiving container, which is supported in this way by water power.

An embodiment is one in which at least one nozzle is aligned in such a way that the nozzle sprays at least one high-pressure water jet in the direction of a deepest point of the trough-shaped throughput vibrator. With this orientation the building material in trowalizing recirculating motion may be effective be acted upon by the high-pressure water jet for detaching the binder from the base material. The orientation of the high-pressure water jet towards the deepest point of the trough-shaped throughput vibrator also ensures that the impinged building material is slowed down in the circulated building material before the acted upon building material reaches the deepest point of the trough-shaped throughput vibrator. This effectively prevents damage to the throughput vibrator by the building material accelerated by the high-pressure water jet. Also in this orientation, the trowalizing movement of the building material is supported by the water force of the high-pressure water jet.

In accordance with an embodiment of the disclosure, it is provided that a plurality of nozzles are aligned along the trough-shaped throughput vibrator, each of which is oriented such that the nozzles each spray at least one high pressure water jet toward a deepest point of the trough-shaped throughput vibrator. With this orientation, the building material set in the circulating motion along the trough-shaped throughput vibrator may be effectively impacted with the high-pressure water jet to detach the binder from the base material. By directing the nozzles towards the deepest point of the trough-shaped throughput vibrator, it can be ensured that the material to which the water jet is applied is slowed down in the remaining material fluidized in the trough before the material to which the high-pressure water jet is applied reaches the deepest point of the trough-shaped throughput vibrator. This effectively prevents damage to the throughput vibrator by the building material accelerated by the high-pressure water jet. In the selected orientation, the movement of the building material along the trough-shaped throughput vibrator is supported by the water force of the high-pressure water jet.

An embodiment is one in which at least one nozzle generates a plurality of high-pressure water jets rotating about a nozzle rotation axis, the directions of radiation of the rotating high-pressure water jets being aligned parallel to the nozzle rotation axis. The rotation of the high-pressure water jets around the nozzle rotation axis continuously changes the point of impact of the high-pressure water jets on the building material in the receiving container. This prevents individual grains of granular building material hit by the high-pressure water jets from being accelerated by the high-pressure water jets in such a way that they emerge from the receiving container, which is open at the top. In addition, the rotation of the high-pressure water jets around the nozzle rotation axis leads to a swirl of the building material, which intensifies the detachment of the binder from the base material.

According to an embodiment of the disclosure, it is provided that at least one nozzle is arranged to be moved laterally in a circulating manner with respect to a radiation direction of the high-pressure water jet. The lateral circulating movement of the at least one nozzle continuously changes the point of impact of the high-pressure water jet on the building material located in the receiving container. This can prevent individual grains of granular building material hit by the high-pressure water jet from being accelerated in such a way that they emerge from the receiving container, which is open at the top. In addition, the lateral displacement of the nozzle relative to the radiation direction of the high-pressure water jet leads to more effective detachment of the binder from the base material.

An embodiment of the device is one that provides a detaching device for separating the detached binder and base material. By separating the detached binder and base material, the material can be individually reused or reused further. For example, the reuse of rock grains for fresh asphalt is economically interesting. A 3-phase separator is suitable as a detaching device. This allows the binder and water to be easily separated from each other, and the base material can be reliably separated.

An embodiment is one in which the detaching device comprises at least one sieve arranged at the bottom of the receiving container, which is designed to allow detached binder and water to pass through and to retain building material and base material in the receiving container. The sieve can be used to keep the filling level of the receiving container with detached binder and water low. This allows the high-pressure water jet to act effectively on the remaining building material, for example until only base material remains in the receiving container. Depending on the mesh size selected for the sieve, the particle size of the remaining material can be adjusted. With a larger mesh size of the sieve, finer base material can be separated from the receiving container with the detached binder. A smaller mesh size of the sieve, on the other hand, also leads to detachment of the binder from finer base material remaining in the receiving container. For example, a grain size of the base material in the range between 1 mm and 22 mm is retained by the sieve in the receiving container.

According to an embodiment of the disclosure, it is provided that the separating device comprises at least one cyclone for separating detached binder and base material. This cyclone is for example a hydrocyclone. With such a hydrocyclone, fine components of the base material can be effectively separated from the water and binder. This also makes it possible to recycle base material particle sizes in the range between 0.063 mm and 1.00 mm.

Furthermore, it is an object of the disclosure to provide a method for recycling building material, for example milled asphalt pavement or road pavement or concrete or foundry sand containing a base material, for example rock grains, and a binder, for example adhering bitumen or tar or cement or iron, for example with a device as described before and in more detail below, comprising the following steps:

- filling building material into a receiving container,
- detachment of the binder from the base material by applying a high-pressure water jet to the building material in the receiving container, and
- separation of the detached binder from the base material. By acting upon the building material filled into the receiving container by a high-pressure water jet, the binder can be easily detached from the base material, so that the separation of the detached binder from the granular base material enables efficient and for example also complete recycling of building material. With the method according to the disclosure, asphalt pavement as building material may be recycled by detaching the bitumen as binder from the rock grains as base material. In addition, the method according to the disclosure can be used to recycle tar-containing road pavement as a building material by detaching the tar as a binder from the rock grains as a base material. Furthermore, concrete or concrete rubble may be recycled as a building material by detaching the cement as a binder from the rock grains as a base material. Furthermore, the method according to the disclosure may also be used to recycle foundry sand as a building material by detaching binder and adhering iron from the sand as a base material.

According to an embodiment of the method, it is provided that the filling of building material, the detachment of the binder from the base material and the separation of the detached binder from the base material are carried out in several successive passes, with the particle size of the base material separated from the binder being reduced with each pass. The successive passes in time allow the base material to be separated from the binder in different particle sizes. Several passes in succession provide for first roughly precleaning the material before a more thorough separation of the base material and binder takes place in a subsequent pass.

DETAILED DESCRIPTION OF THE DRAWINGS

Further features, details of the disclosure will be apparent from the following description and from the drawings, which show examples of embodiments of the disclosure. Corresponding objects or elements are provided with the same reference signs in all figures.

In FIG. 1, designated with the reference sign 1, a device according to the disclosure is shown. The device 1 is used for recycling building material 2 (FIG. 2), which contains granular base material and adhering binder. It has a receiving container 3 for the building material 2. In the embodiment example shown, the receiving container 3 is designed as a trough-shaped throughput vibrator 8. The volume of the receiving container 3 should comprise at least 2000 liters, for example even 3000 liters or more. The receiving container 3 is for example filled with building material 2 at the end by a conveyor feed device 10. The conveyor feed device 10 is for example designed as a conveyor belt, but may also be designed, for example, as a funnel-shaped silo above the receiving container 3 in order to fill it with granular building material. Also shown in the background is a return device 11 of the device 1, via which the building material 2 (FIG. 2) can be returned for several passes through the trough-shaped throughput vibrator 8. In the embodiment example, the return device 11 is formed by a feed hopper 12 arranged at the end of the trough-shaped receiving container 3 and a return conveyor belt 13 which fills the feed hopper 12 with returned building material 2. At the opposite end of the trough-shaped throughput vibrator 8, the detaching device 9 of the device 1 is arranged, via which detached binder and base material can be separated. The detaching device 9 has, among other things, a wet sieving for grains between 0.063 mm and 32 mm in diameter. The detachment of the binder from the grains of the building material 2 takes place in the trough-shaped throughput vibrator 8.

Figure 2:
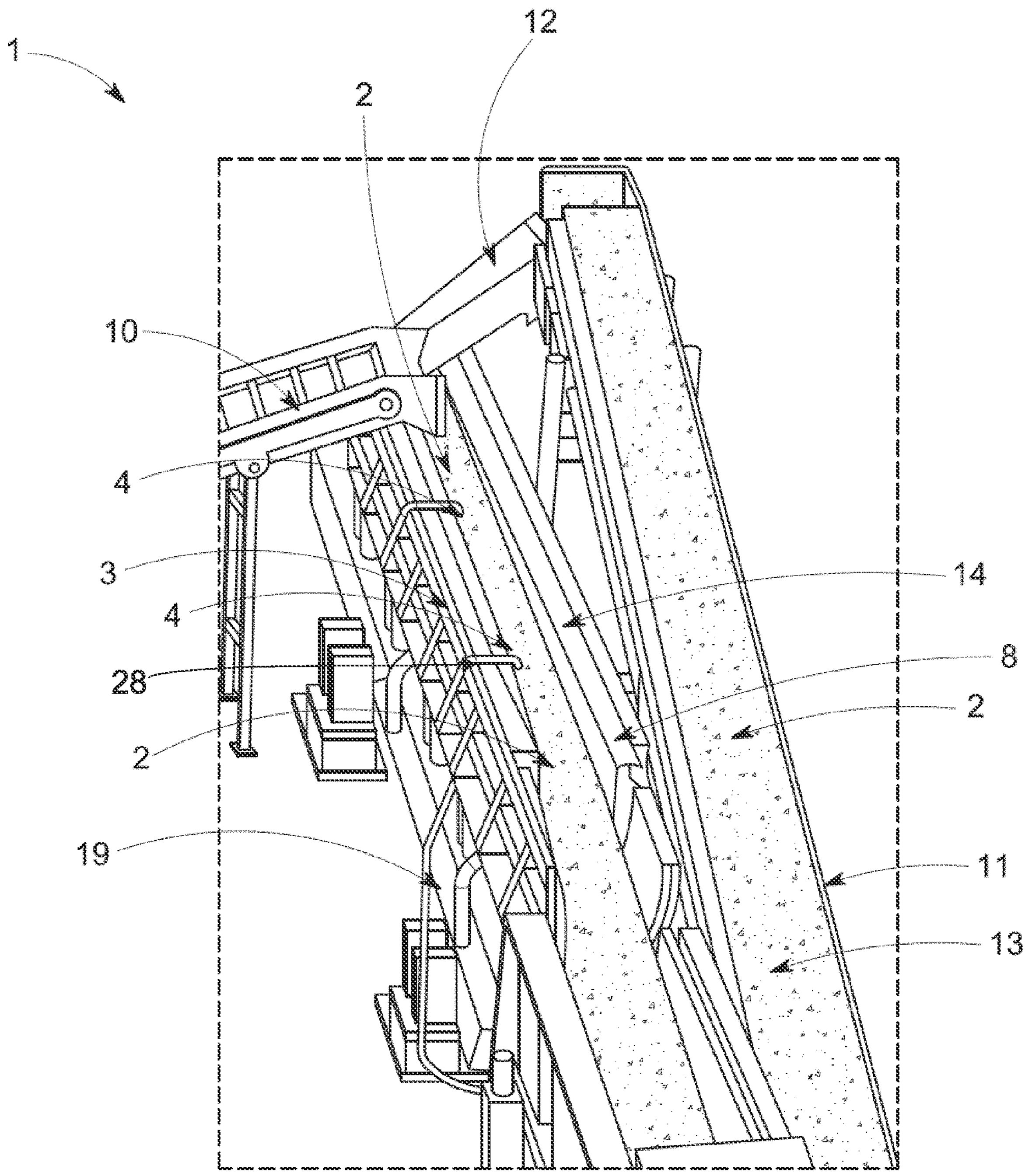
FIG. 2 shows a view of the trough-shaped throughput vibrator.

FIG. 2 shows a view of the trough-shaped throughput vibrator 8 of the device 1. Here it can be seen that the building material 2 in the receiving container 3 is each acted upon by a high-pressure water jet 5 via several nozzles 4 for detaching the binder from the base material. This allows the binder to be detached from the base material efficiently. The impingement of the base material 2 in the receiving container 3 with high-pressure water jets 5 provided via the nozzles 4 enables efficient recycling, since the binder can thereby be easily detached from the base material grains.

Figure 3:
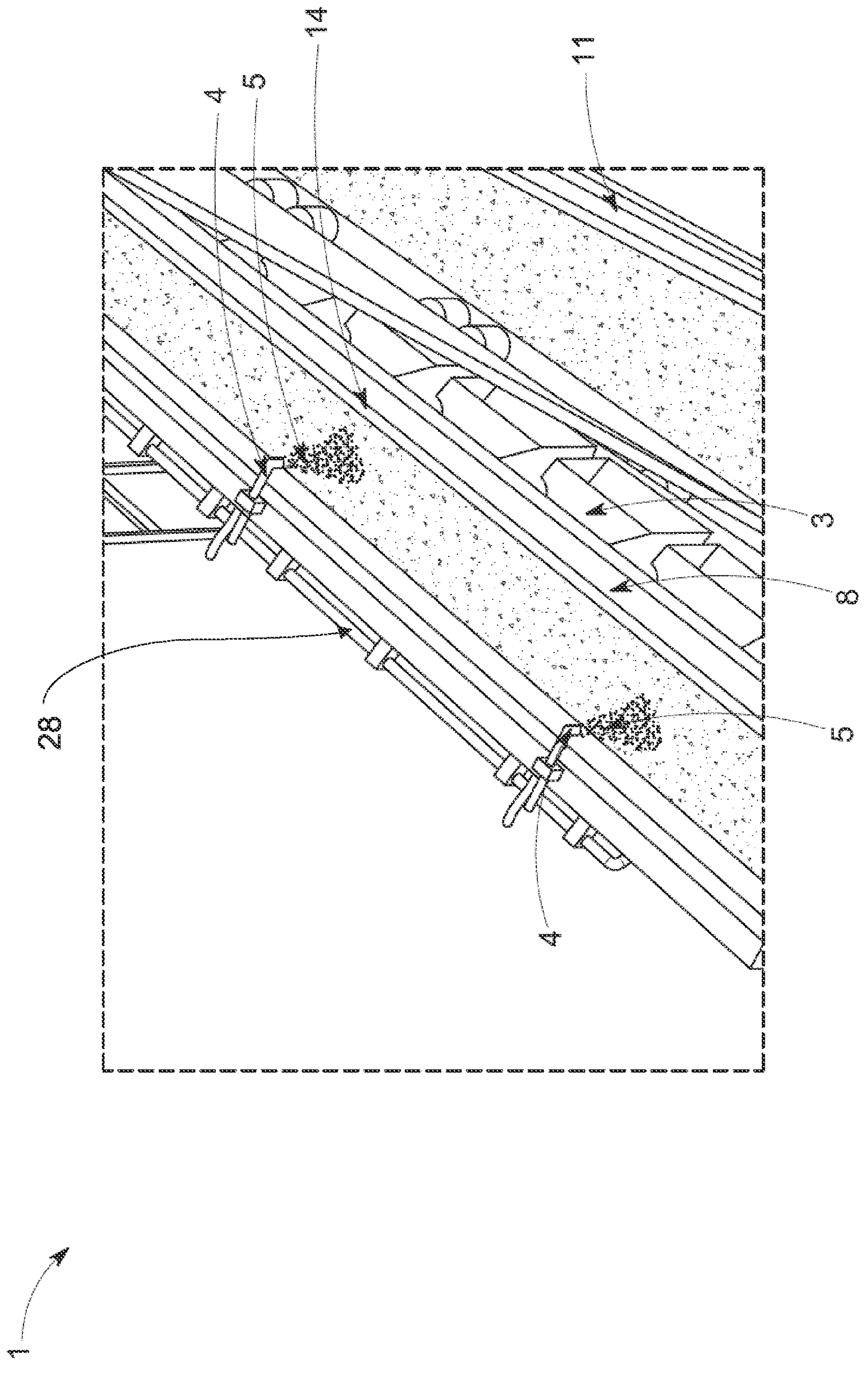
FIG. 3 shows another view of the trough-shaped throughput vibrator.

For example, several nozzles 4 are arranged along the trough-shaped throughput vibrator 8, as can also be seen from FIG. 3. The spacing of the nozzles 4 can also be selected so that the combined high-pressure water jets 5 of the nozzles 4 form a continuous water jet wall along the throughput vibrator 8. The high-pressure water jet 5 for example has at all nozzles 4 a water pressure of over 1000 bar, for example 1000 to 5000 bar, further for example 1000 to 3000 bar, since in this pressure range an effective detachment of the binder from the base material is possible with the sprayed-on water. The receiving container 3 is lined from the inside with a protective lining 14, which protects the receiving container 3 against abrasion by the building material 2. The receiving container 3 is for example lined with a polyurethane. The spacing of the nozzles 4 along the trough-shaped throughput vibrator 8 is 50 cm for example.

Figure 3A:
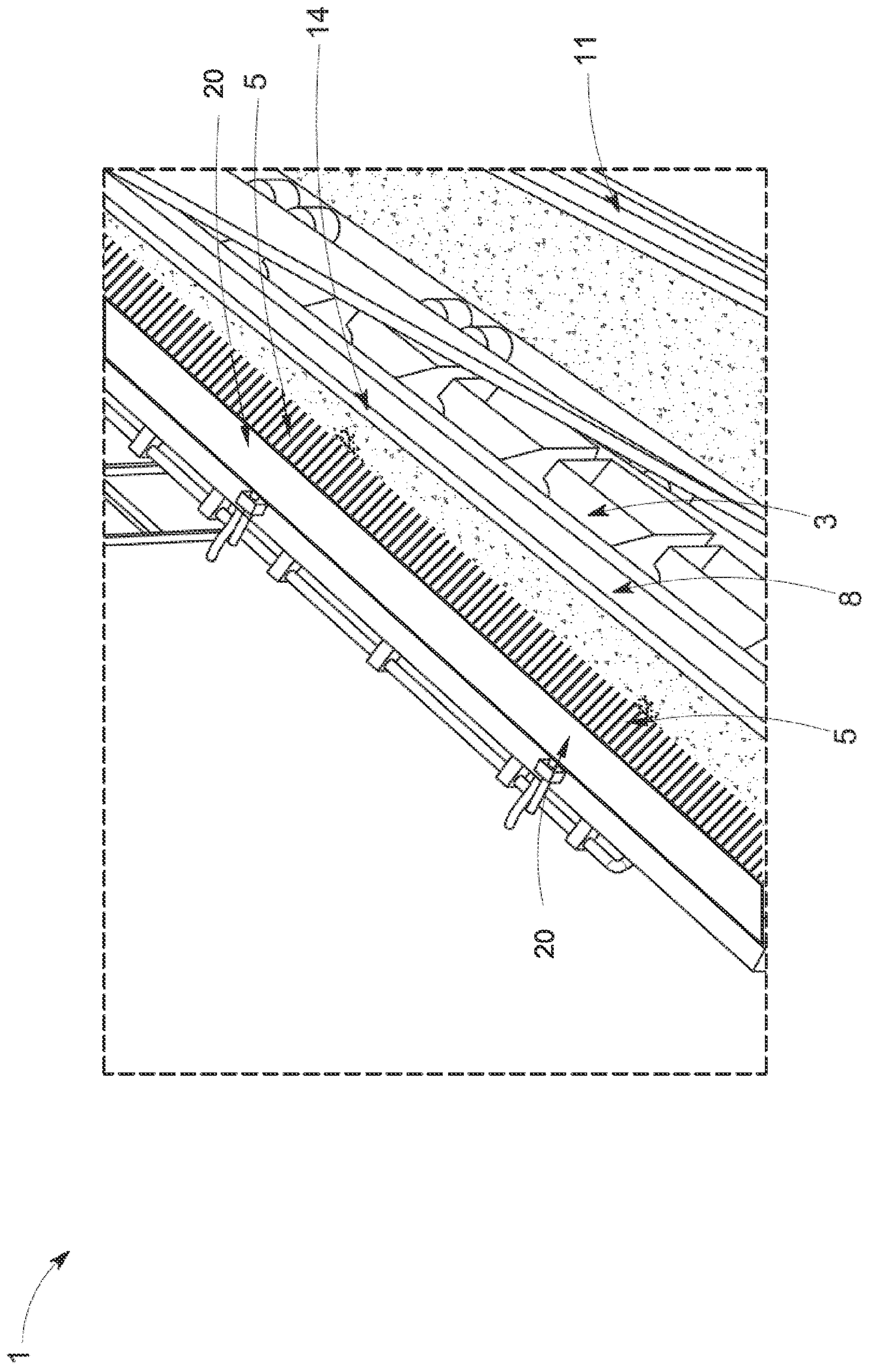
FIG. 3*a* another view of the trough-shaped throughput vibrator.

FIG. 3*a* shows an embodiment in which the nozzles along the trough-shaped throughput vibrator 8 are designed as a water jet bar 20. As a result, the interaction of the nozzles of the water jet bar 20 creates a continuous water jet wall 5 along the throughput vibrator 8.

Figure 4:
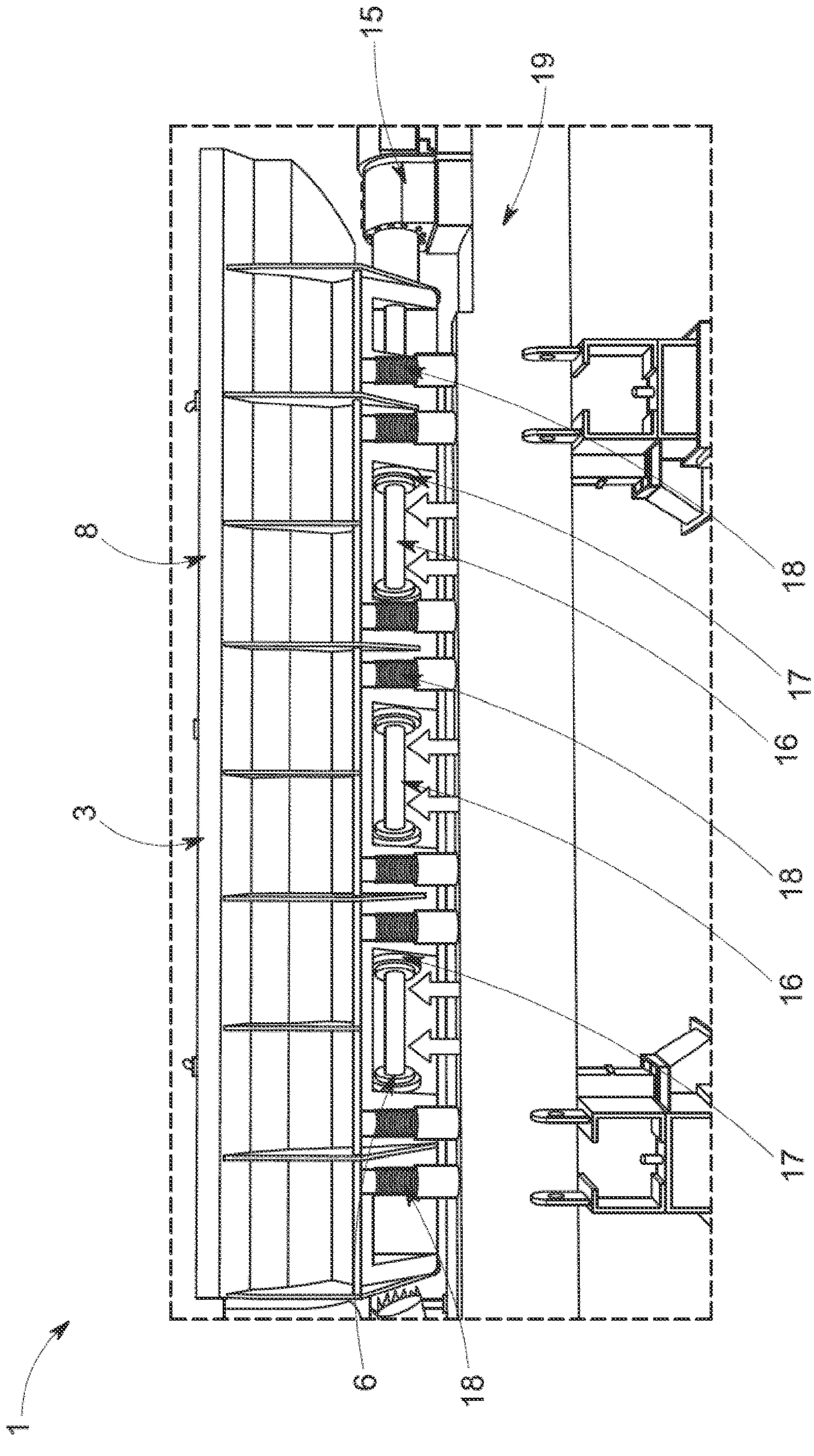
FIG. 4 is a view of an actuator arranged on a receiving container.

FIG. 4 shows a view of the actuator 6 arranged on the receiving container 3. This actuator 6 serves to set the building material 2 in motion in the receiving container 3. At the same time, the building material 2 (FIG. 2) is exposed to high-pressure water jets 5 (FIG. 3) from the nozzles 4 (FIG. 3). This supports the movement of the building material 2 (FIG. 2) in the receiving container 3 (FIG. 2), as will be explained in more detail below. The actuator 6 is designed to set the receiving container 3 in motion by means of imbalance. For this purpose, the actuator 6 has a drive 15 which drives a drive shaft 16. The drive shaft 16 is mounted on the receiving container 3, with a plurality of imbalance weights 17 being arranged on the drive shaft 16, which are set in rotation via the drive 15 and the drive shaft 16. The receiving container 3 is spring-mounted on a frame 19 via a plurality of springs 18, so that the imbalance generated by the imbalance weights 17 causes the receiving container 3 to oscillate. This movement of the receiving container 3 is designed to fluidize the building material 2 received in the receiving container 3 and to set it into a vortex-like, for example circulating movement 7 (FIG. 5).

Figure 5:
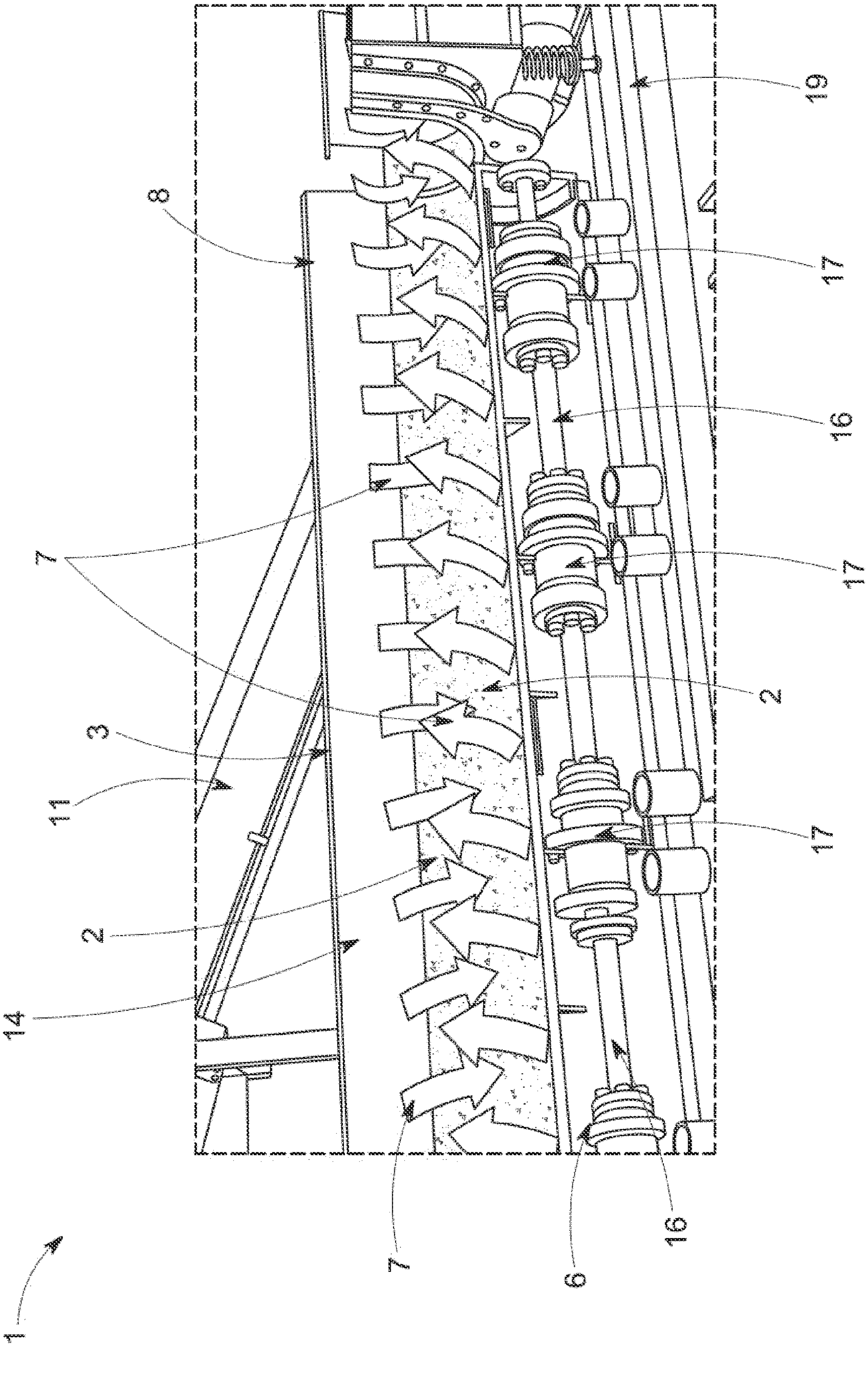
FIG. 5 section along the trough-shaped throughput vibrator.

This is indicated in FIG. 5, which shows a sectional view along the trough-shaped throughput vibrator 8 (FIG. 3 or 3*a*). As can be seen, the trough-shaped throughput vibrator 8 set in motion provides a trowalizing movement 7 of the building material 2 in the receiving container 3. The nozzles 4 (FIG. 2) arranged along the trough-shaped throughput vibrator 8 or the water jet bar 20 (FIG. 3*a*) 19 support this trowalizing movement 7 of the building material 2 along the trough-shaped throughput vibrator 8 by water force. The movement leads to internal abrasion, i.e. to an abrasive effect of the base material grains among each other. This considerably enhances the detachment of the binder in addition to the direct water jet action. However, the abrasion leads to a high degree of grain fragmentation, so the high frictional energy of the water from the high-pressure water jet is to be used primarily to detach the binder from the moving base material grains.

Figure 6:
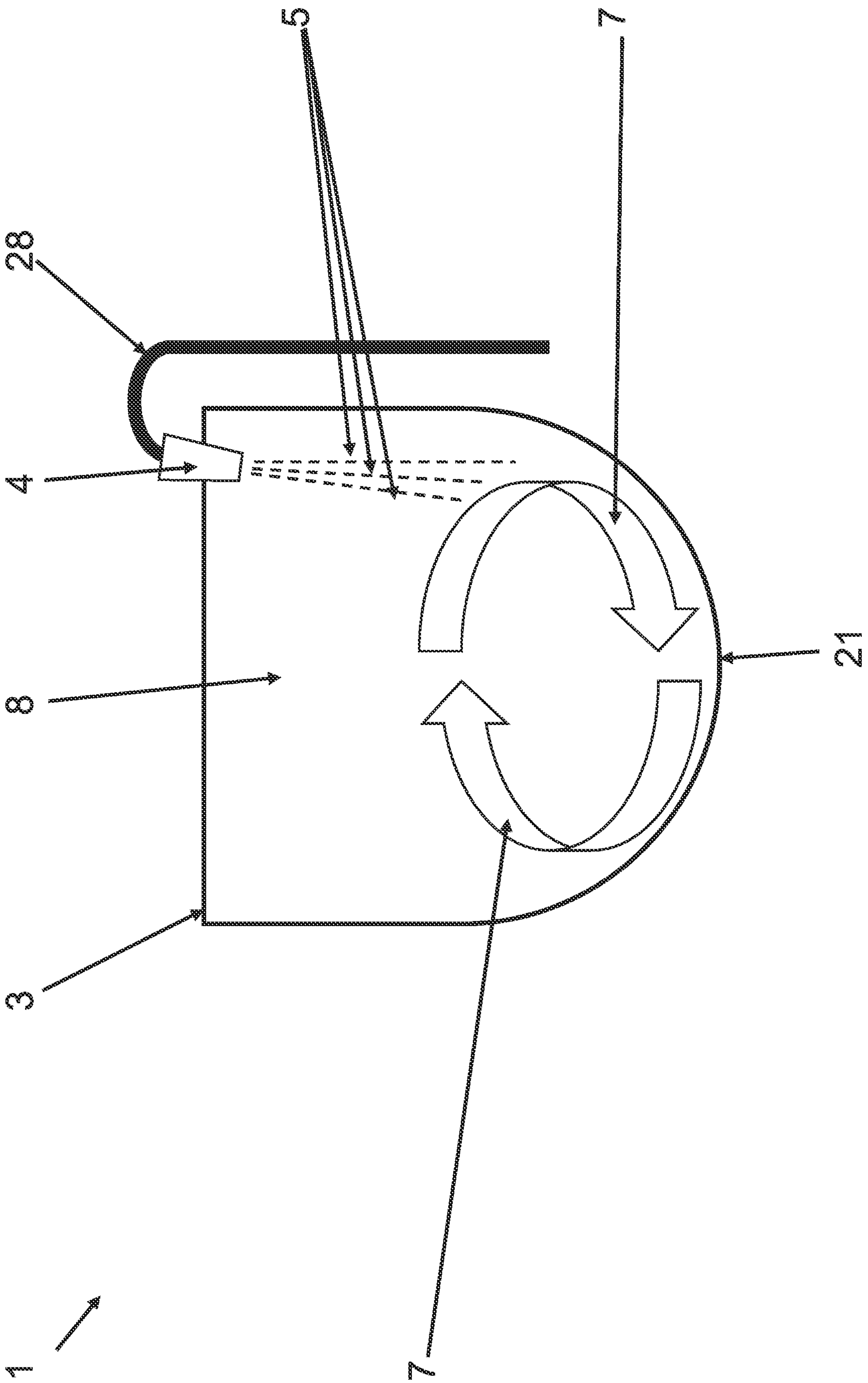
FIG. 6 shows a section through the trough-shaped throughput vibrator.

In this regard, reference is also made to FIG. 6, which shows a sectional view through the trough-shaped throughput vibrator 8. In this illustration it can be seen that the movement of the receiving container 3 in combination with the high-pressure water jet 5 is designed to fluidize the building material 2 received in the receiving container 3 and to set it into a vortex-like, for example circulating movement. The high-pressure water jet 5 of the nozzle 4 is aligned in such a way that this trowalizing movement 7 of the building material 2 is supported by water power. For this purpose, the angle of impact of the water jet on the building material 2 in the trowalizing movement 7 is aligned in such a way that the vortex-like, for example circulating movement 7 is supported tangentially by the high-pressure water jet 5.

Figure 7:
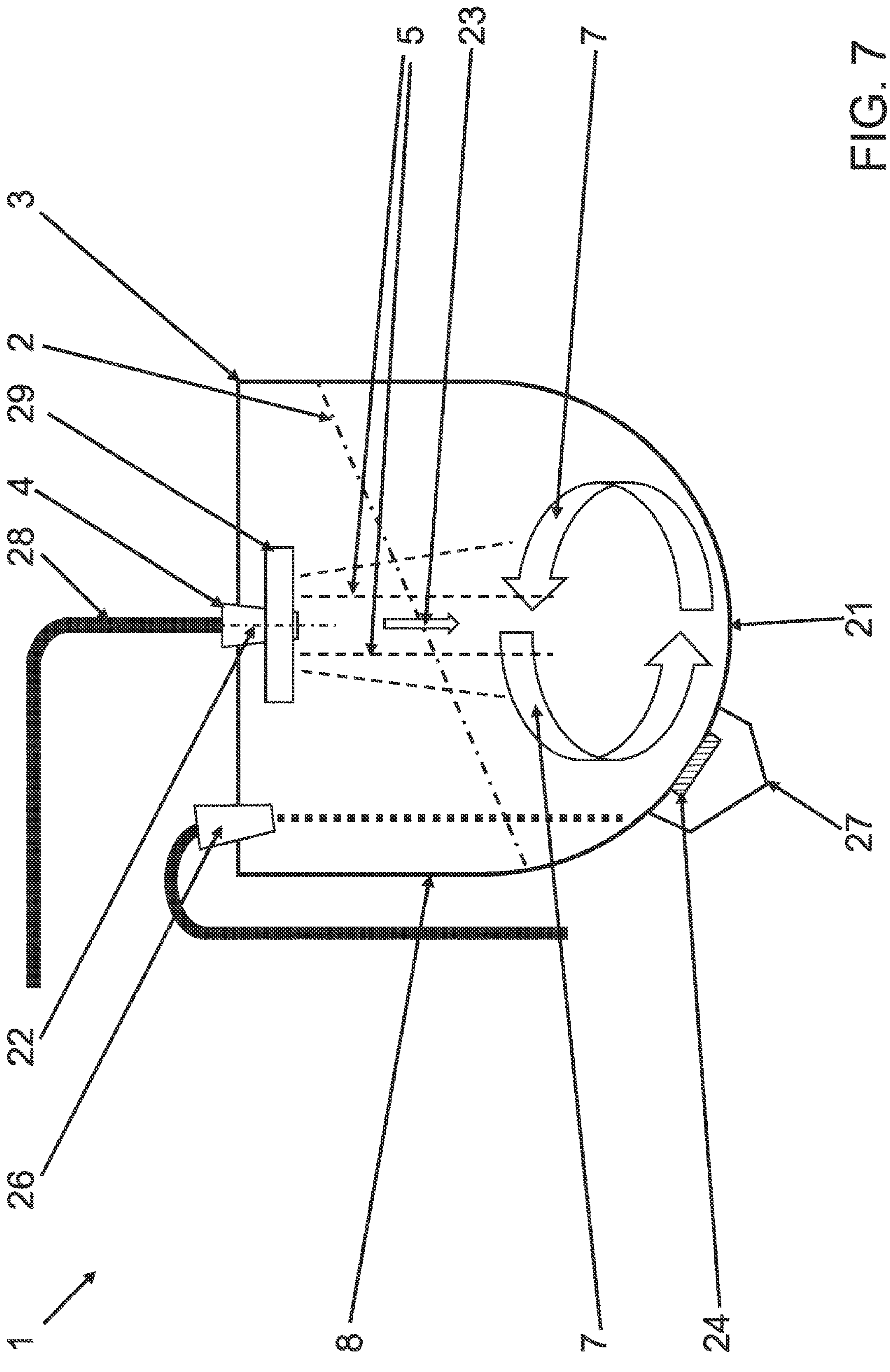
FIG. 7 shows a section through another trough-shaped throughput vibrator
Figure 10:
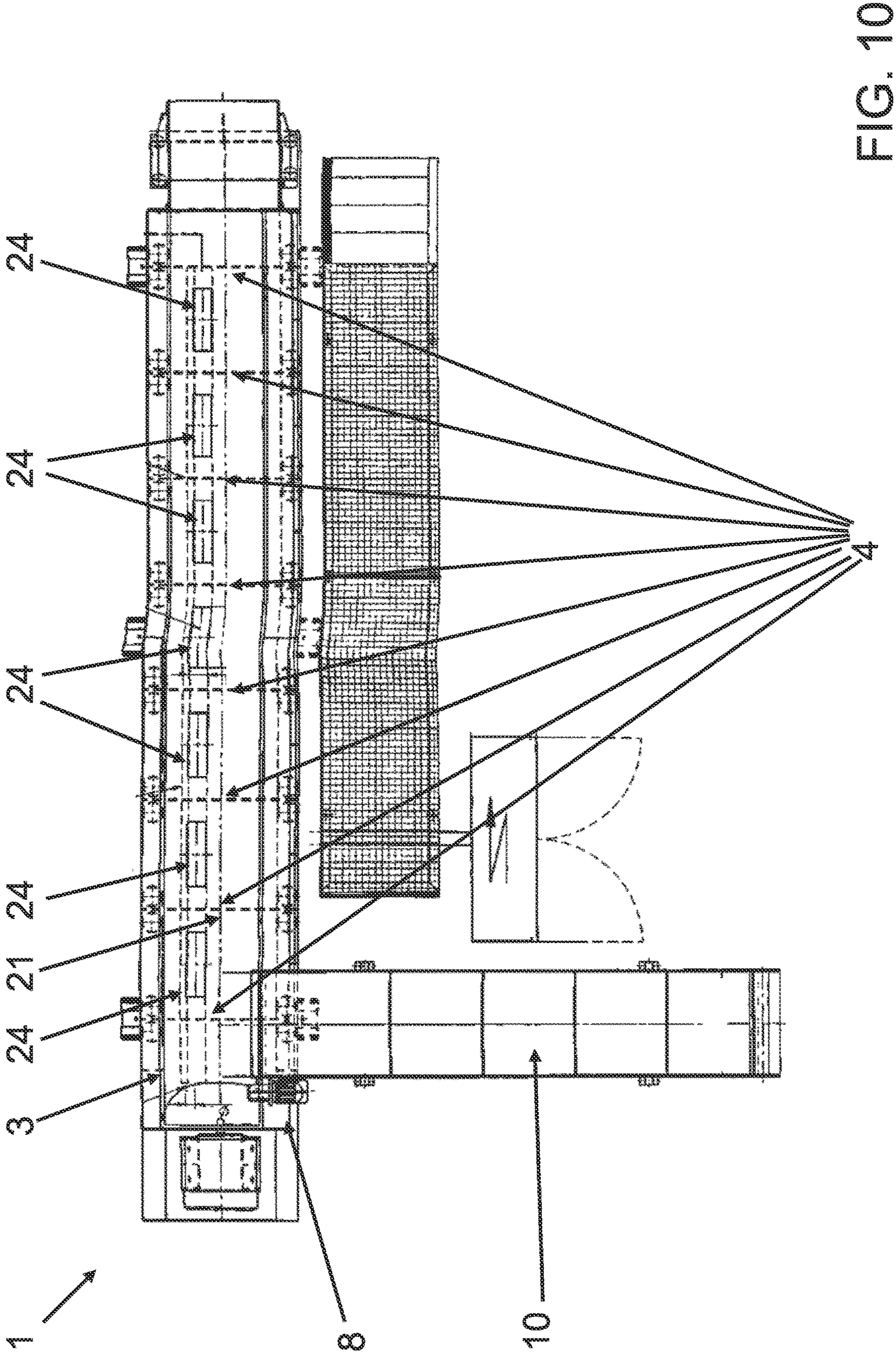
FIG. 10 shows a another view of the device.

FIG. 7 shows a sectional view through a trough-shaped throughput vibrator 8 in a modified version. In this illustration, it can be seen that the movement of the receiving container 3 in combination with the high-pressure water jet 5 is designed to also fluidize the building material 2 received in the receiving container 3 and to set it into a vortex-like, for example circulating movement. The high-pressure water jet 5 of the nozzle 4 is also aligned in such a way that the trowalizing movement 7 of the building material 2 is supported by the water force of the high-pressure water jet 5. For this purpose, the nozzle 4 is oriented in such a way that the nozzle 4 sprays at least one high-pressure water jet 5 in the direction of the deepest point 21 of the trough-shaped throughput vibrator 8. As FIG. 3 and FIG. 10 show, several of these nozzles 4 can also be arranged along the trough-shaped throughput vibrator 8 and each be oriented in such a way that the nozzles 4 each spray at least one high-pressure water jet 5 in the direction of a deepest point 21 of the trough-shaped throughput vibrator 8. The orientation of the nozzles 4 ensures effective detachment of the binder from the base material from the building material 2 set in the trowalizing recirculating movement 7. With the orientation of the high-pressure water jets 5 towards the deepest point 21 of the trough-shaped throughput vibrator 8 it can be ensured that the building material 2 acted upon is slowed down in the further recirculated building material 2, before the acted upon building material 2 reaches the deepest point 21 of the trough-shaped throughput vibrator 8. Therefore, damages to the throughput vibrator 8 can be effectively prevented, which the building material 2 accelerated by the high-pressure water jet 5 would produce in the receiving container 3 if the accelerated material 2 were not decelerated in the remaining building material 2. The nozzle 4 shown in FIG. 7 generates a plurality of high-pressure water jets 5 rotating about a nozzle rotation axis 22. The directions of radiation 23 of the rotating high-pressure water jets 5 are oriented substantially parallel to the nozzle rotation axis 22. Via the rotation of the high-pressure water jets 5 about the nozzle rotation axis 22 the point of impact of the high-pressure water jets 5 on the building material 2 located in the receiving container 3 is continuously changed. This can prevent individual grains of the granular building material 2 from being accelerated by the high-pressure water jets 5 in such a way that they emerge from the upwardly open receiving container 3. The rotation of the high-pressure water jets 5 about the nozzle rotation axis 22 also leads to a vortex of the building material 2 located in front of the nozzle 4, which leads in the direction of the deepest point 21 of the trough-shaped throughput vibrator 8. Via this vortex, the detachment of the binder from the base material in front of the nozzle 4 is further intensified. The nozzles 4 of the device 1 may also perform circulation movements laterally to the direction of radiation 23 of the high-pressure water jets 5. These lateral circulation movements of the nozzles 4 continuously change the point of impact of the high-pressure water jets 5 on the building material 2 located in the receiving container 3. This can prevent individual grains of the granular building material 2 hit by the high-pressure water jet 5 from being accelerated in such a way that they emerge from the receiving container 3, which is open at the top. In addition, the lateral displacement of the nozzle 4 relative to the direction of radiation 23 of the high-pressure water jet 5 leads to more effective detachment of the binder from the base material. The lateral circulation movements are for example elliptical translational movements of the nozzles 4, further for example in a plane orthogonal to the direction of radiation 23 of the high pressure water jets 5. The lateral feed route for the circulation movements should be between 200 mm and 300 mm. The entire energy of the high-pressure water jet 5 can thus be introduced into the building material 2 and the highest energetic benefit results without the building material 2 flying out of the receiving container 3. For this displacement of the nozzles 4, a nozzle holder 28 (FIG. 3) is provided which can be advanced relative to the receiving container 3 and which is for example motor-driven in order to change the position of the nozzles 4 relative to the receiving container 3. For example, the nozzles 4 can also be positioned by motor in the direction of the receiving container 3 in order to set an optimum distance to the building material 2 located in the receiving container 3. As indicated in FIG. 7, the building material 2 is for example piled up at an angle in the throughput vibrator as a result of the trowalizing movement. The optimum distance of the nozzles 4 from the building material 2 to achieve effective detachment of binder by means of the high-pressure water jet 5 is 1 mm to 20 mm. For example, the nozzles 4 can be lowered at the nozzle holder 28 by half the trough height of the receiving container 3, for example by up to 300 mm, after the receiving container 3 has been filled. In this way, the nozzles 4 are not in the way when filling the receiving container 3 and an optimum distance can still be set for detaching the binder from the base material. At the bottom of the receiving container 3 shown in FIG. 7, a sieve 24 of the detaching device 9 is shown. This sieve 24 is designed to allow detached binder and water to pass through and to retain building material 2 and base material in the receiving container 3. In this way, the filling level of the receiving container 3 with detached binder and water can be kept low. In this way, the building material 2 remaining in the receiving container 3 may be effectively acted upon with a high-pressure water jet 5. The aim of this detachment via the sieve 24 is merely to retain the base material in the receiving container 3 and to separate the binder detached from the building material 2 and the water via the sieve 24. The grain size of the remaining building material 2 can be adjusted very easily via the selected mesh size of the sieve 24. A larger mesh size of the sieve 24 results in finer base material being separated from the receiving container 3 along with the detached binder. A smaller mesh size, on the other hand, allows the binder to also be detached from finer base material in the receiving container 3. The sieve 24 is for example arranged laterally offset from the deepest point 21 of the trough-shaped receiving container 3 so that the high-pressure water jet 5 of the centrally arranged nozzle 4 does not accelerate any grains of the building material 2 towards the sieve 24. In this way, damage and heavy wear of the sieve 24 can be prevented. The sieve 24 should for example have a mesh size of 0.5 mm to 3 mm. In order to keep the sieve 24 free of deposits, a separate rinsing nozzle 26 is provided, with which additional water is rinsed onto the sieve 24. On the one hand, this water flushes detached binder out of the receiving container 3, and on the other hand it ensures that the meshes of the sieve 24 are not clogged with grains of the building material 2. The detached binder and water can be discharged via the discharge channel 27 arranged below the sieve 24 and is for example recycled, as will be explained later. Via the trowalizing movement 7 of the building material 2 in the throughput vibrator 8, the sieving process is supported by the sieve 24.

Figure 8:
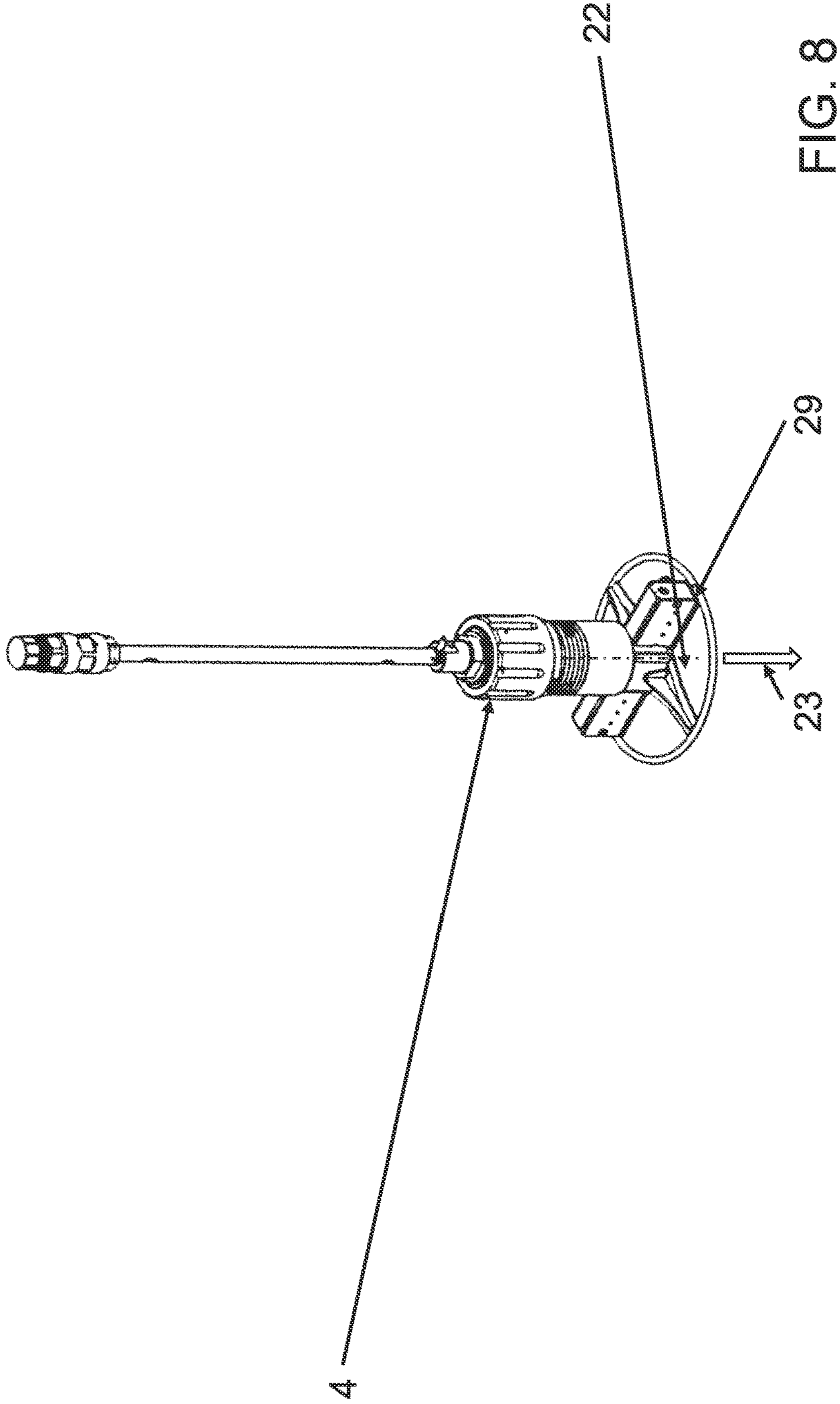
FIG. 8 shows a view of a nozzle.

FIG. 8 shows a single view of a nozzle 4 which may generate several high-pressure water jets 5 (FIG. 7) rotating about a nozzle rotation axis 22. For this purpose, the nozzle 4 has a nozzle head 29 rotatable about the nozzle rotation axis 22. This nozzle head 29 can be driven by water power or also by an electric motor for rotation about the nozzle rotation axis 22. The rotation of the nozzle head 29 about the nozzle rotation axis 22 results in a water/building material vortex in front of the nozzle 4. Via this vortex, the detachment of the binder from the base material in front of the nozzle 4 is increased. In addition to the trowalizing movement 7 (FIG. 7) of the building material 2 (FIG. 7) by the throughput vibrator 8 (FIG. 7), this provides additional friction and thus more effective detachment of the binder from the base material. Via the electric motor of the nozzle 4, the rotation of the nozzle head 29 may be optimally adjusted for a high cleaning performance.

Figure 9:
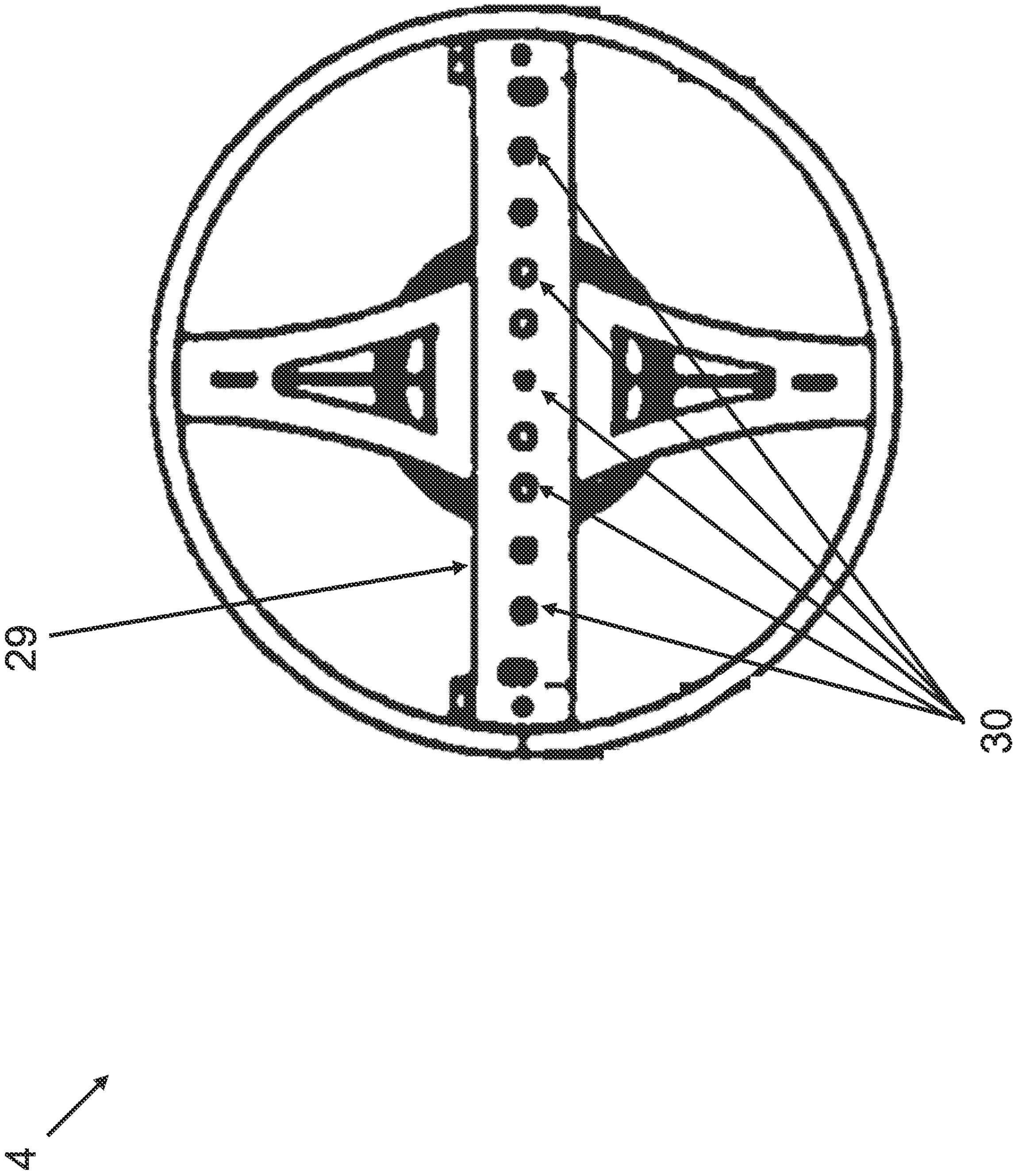
FIG. 9 shows a detailed view of a nozzle.

FIG. 9 shows a detailed view of the nozzle 4 as shown in FIG. 8, as seen from the nozzle rotation axis 22. Here it can be seen that the nozzle head 29, which rotates around the nozzle rotation axis 22 (FIG. 8), has a row of individual nozzles 30, each of which generates a high-pressure water jet 5.

FIG. 10 discloses a bird's-eye view of a device 1 with a trough-shaped throughput vibrator 8. In this embodiment, the receiving container 3 shown, as already shown in sectional view in FIG. 7, has several corresponding sieves 24 arranged along the trough-shaped receiving container 3 at the bottom. These sieves 24, arranged side by side along the trough-shaped receiving container 3 at the bottom of the throughput vibrator 8, each separate detached binder and water and retain the building material 2 (FIG. 5) and the base material in the receiving container 3. The sieves 24 are for example connected via a common discharge channel 27 (FIG. 7), which is for example flushed continuously with water to remove the dissolved binder. For this purpose, additional flushing nozzles are arranged in the discharge channel 27 (FIG. 7) at each sieve 24. FIG. 10 also shows that the sieves 24 are arranged laterally offset from the deepest point 21 of the trough-shaped receiving container 3. A conveyor feed device 10 in the form of a conveyor belt is provided at the end of the receiving container 3, with which the throughput vibrator 8 may be filled with building material 2. In the version shown here, a total of eight nozzles 8 are arranged along the trough-shaped receiving container 3.

In order to recycle milled building material 2 containing granular base material and adhering binder with the device 1, the building material 2 simply has to be filled into the receiving container 3 (FIG. 1) via the conveyor feed device 10 (FIG. 1). Subsequently, the binder is detached from the basic material grains in the receiving container 3 (FIG. 1) by acting upon the building material 2 (FIG. 2) by the high-pressure water jet 5 (FIG. 6). Subsequently, the detached binder is separated from the base material grains by the detaching device 9 (FIG. 1). If the binder is not completely detached during one pass through the trough-shaped receiving container 8 (FIG. 3), the material can be returned for another pass through the throughput vibrator 8 (FIG. 3 or 3*a*) via the return device 11 (FIG. 1).

Figure 11:
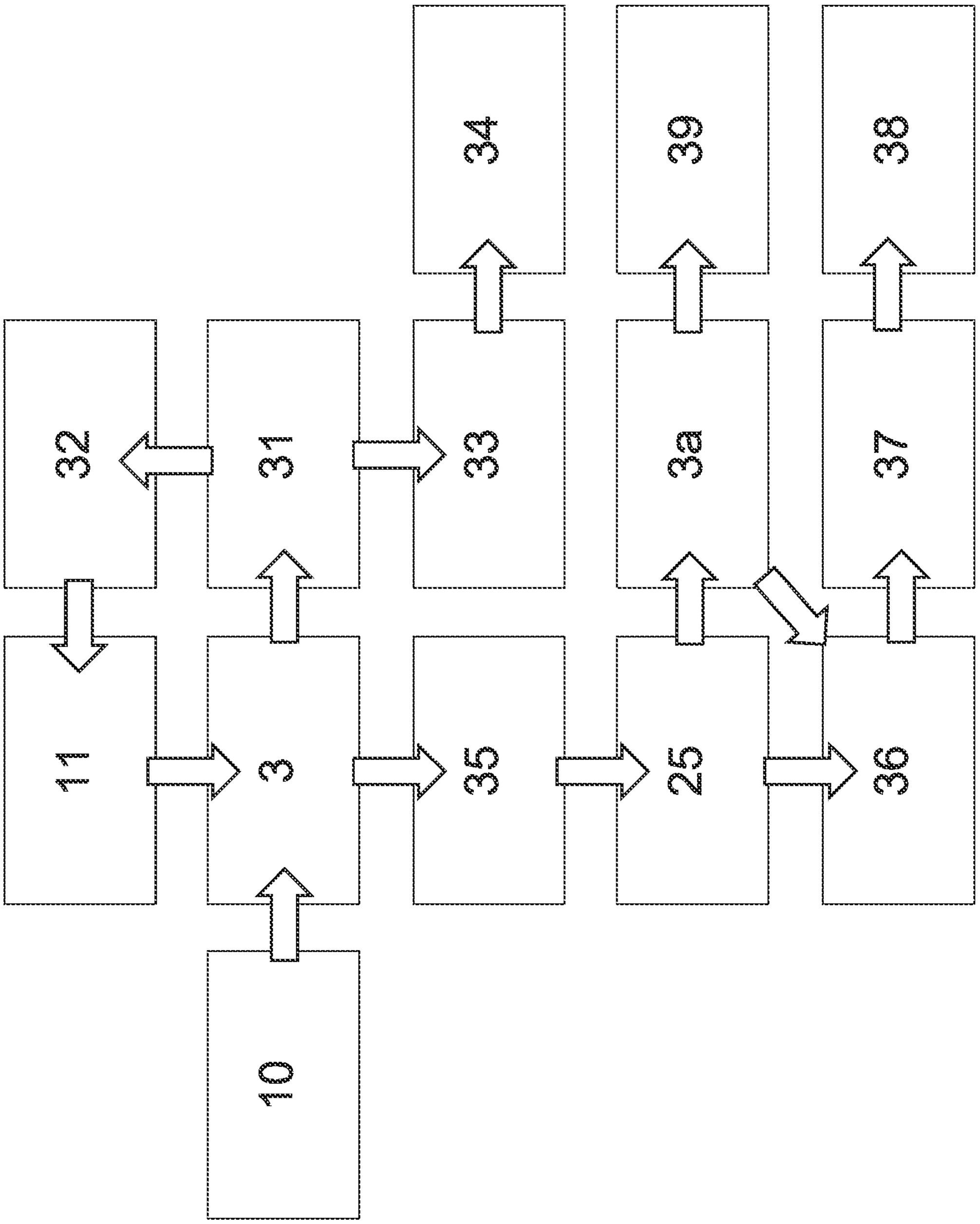
FIG. 11 shows a flow chart for recycling of building material.

FIG. 11 shows a schematic flow chart for recycling building material with a device 1 according to the disclosure and with the method according to the disclosure. First, the building material 2 to be recycled (FIG. 5) is filled into the receiving container 3 of a device 1 according to the disclosure (FIG. 1) via the conveyor feed device 10. This can be done by means of an excavator or wheel loader, which fills a receiving hopper or a dispenser, via which the conveyor feed device 10 is loaded with building material 2 (FIG. 5). A mechanical pre-treatment of the building material 2 (FIG. 5) may also still take place before the building material 2 (FIG. 5) is filled into the receiving container 3. In the mechanical pretreatment, the building material 2 (FIG. 5) may be granulated. A two-shaft octagonal crusher is suitable for this purpose, since it hardly crushes the base material. This allows compressed conglomerates of the building material 2 (FIG. 5) to be reliably broken up and the building material 2 (FIG. 5) is optimally prepared for detaching the binder from the base material in the device 1 (FIG. 1), since the surface of the building material 2 (FIG. 5) is increased for exposure to the high-pressure water jet 5. Depending on the building material 2 (FIG. 5), the detachment of the binder from the base material can take between 5-20 minutes. During the detachment of the binder from the base material, the material in the receiving container 3 is for example rinsed via separate rinsing nozzles 26 in order to achieve a higher flowability. However, the flowability is not achieved by the water, but by the additional swirling on the sieves 24 (FIG. 10). These sieves 24 (FIG. 10) are thereby for example rinsed free in such a way that the sieve surfaces do not become clogged due to the high fines content and the water can continue to flow off. The sieve area is for example between 0.4-1 $m^2$ per trough. A correspondingly larger receiving container 3 will also have a larger sieving area. As soon as the water level in the receiving container 3 is too high, the building material loses its adhesion to the throughput vibrator 8 (FIG. 10) and thus the property of flowability and the trowalizing movement 7 (FIG. 5) for loosening the building material 2 (FIG. 5) breaks down. After the binder has been detached from the building material 2 (FIG. 5) in a first pass, the pre-cleaned base material can be stored in a buffer 32 via a metering belt 31. The metering belt 31 is for example designed as an exchange belt. This allows finally cleaned base material to be applied to a conveyor belt 33 and stockpiled on a first stockpile 34 for further use. The buffer 32 for example stores pre-cleaned material with a grain size of greater than 2 mm. Subsequently, another batch of building material 2 can be pre-cleaned in the receiving container 3. Precleaning should for example take about 5 minutes. After two pre-cleanings, the pre-cleaned material stored in the buffer 32 can already be returned to the receiving container 3 via a return device 11. After the subsequent removal of binder in a further pass, the finally cleaned base material is conveyed from the receiving container 3 to the first stockpile 34 and is available for further use. The base material recycled in this way for example has a grain size of 1 to 22 mm. The water and binder separated during the detachment of the binder from the base material from the receiving container 3, for example via the sieves 24 (FIG. 10), are for example separated from each other in an oil separator 35 and then in a cyclone 25. The water can then be reused to detach binder when a high-pressure water jet 5 (FIG. 7) is acted upon the building material 2 (FIG. 7) in the receiving container 3. Binder can be effectively separated in the oil separator 35. The separated binder can be further processed in a decanter 36 and a thickener 37. Subsequently, the binder can be pressed into a filter cake in a filter press 38 to remove any water still contained therein. There are now two possibilities for using the filter cake, depending on the material. An uncontaminated bituminous filter cake can, for example, be made available to a refinery operator, thus obtaining pure bitumen, or it can be added in small quantities of 10-20% to the asphalt production. In the case of polluted filter cake contaminated with tar, the polluted binder fraction would be removed from the cycle by burning it in a cement plant, for example. The required cement raw material is, among other things, limestone powder. This is contained to 80% in the basic material and the contaminated binder can be used as fuel in the furnace. The binder separated from the cyclone 25 can be filled into a receiving container 3*a* of a further device 1 according to the disclosure for a further pass, in order to dissolve the binder from further base material contained therein by means of the method according to the disclosure. Subsequently, the base material thus dissolved out can be stockpiled on a separate, second stockpile 39. This material has for example a grain size of 0.063 mm to 1 mm. The binder separated from the receiving container 3*a* can also be fed to the decanter 36, the thickener 37 and the filter press for further processing.

Figure 12:
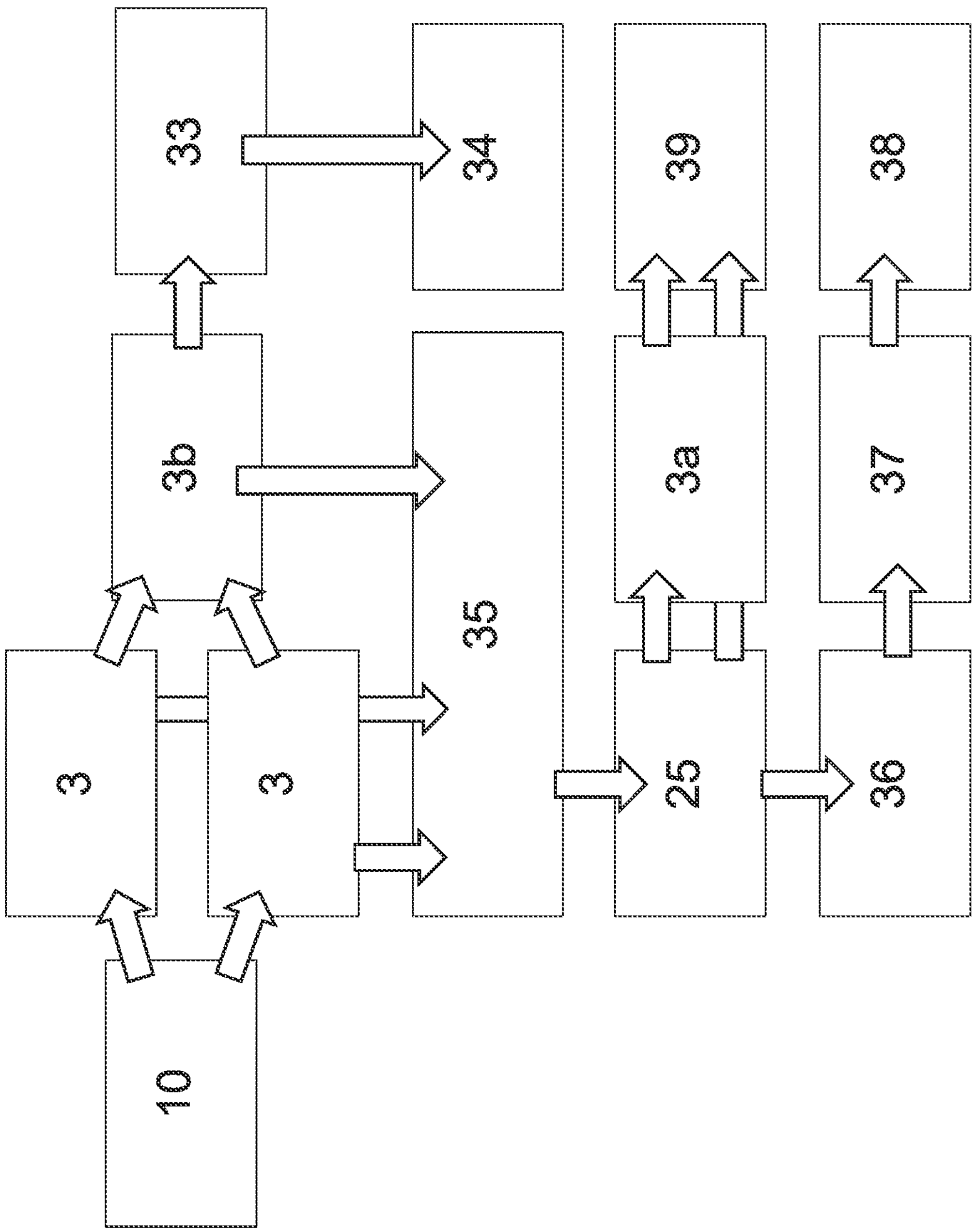
FIG. 12 shows a further flow chart for recycling of building material.

FIG. 12 shows a further schematic flow diagram for recycling building material 2 (FIG. 5) with a device 1 according to the disclosure (FIG. 1) and with the method according to the disclosure in a slightly different embodiment. First, building material 2 to be recycled is filled into two receiving containers 3 of corresponding devices 1 according to the disclosure (FIG. 1) via a conveyor feed device 10. A mechanical pre-treatment of the building material 2 (FIG. 5) may also be carried out before the building material 2 (FIG. 5) is filled into the receiving containers 3. After detaching the binder from the building material 2 (FIG. 5) in a first pass, the pre-cleaned base material may be conveyed from the two receiving containers 3 into a further receiving container 3*b* of a corresponding device 1 according to the disclosure (FIG. 1). After the subsequent detachment of binder in a further pass in the further receiving container 3*b*, the finally cleaned base material is conveyed to the first stockpile 34 and is available for further use. The base material stockpiled here for example has a grain size of 1 to 22 mm. The water and binder separated from the base material during the detachment of the binder from the receiving containers 3, 3*b* are for example separated from each other in an oil separator 35 and then in a cyclone 25. Here, too, the water may then be used again to separate binder when building material 2 (FIG. 7) is acted upon by a high-pressure water jet 5 (FIG. 7) in the receiving containers 3, 3*b*. For this purpose, the binder from the receiving containers 3, 3*b* is also separated via the oil separator 35. The separated binder can be further processed in a decanter 36 and a thickener 37. Subsequently, the binder can also be pressed in a filter press 38 to form a filter cake and used further as already described. The binder separated from the cyclone 25 may also be filled into a receiving container 3*a* of a device 1 according to the disclosure (FIG. 1) for a further pass, in order to dissolve the binder from further base material contained therein by means of the method according to the disclosure. Subsequently, the base material thus released may be stockpiled on a separate, second stockpile 39. Depending on the design of the cyclone 25, separated base material therefrom can also be stockpiled directly on the second stockpile 39. This material for example has a grain size of 0.063 mm to 1 mm.

The disclosure provides for an improved device which provides a more efficient way of recycling building material. Furthermore, a more efficient method for recycling building material is provided.

LIST OF REFERENCE SIGNS

1 device
2 building material
3 3*a* 3*b* receiving container
4 nozzle
5 high-pressure water jet
6 actuator
7 movement, trowalization movement
8 throughput vibrator
9 detaching device
10 conveyor feed device
11 return device
12 feed hopper
13 return conveyor belt
14 protective lining
15 drive
16 drive shaft

17 imbalance weights
18 springs
19 frame
20 water jet bar
21 deepest point in the throughput vibrator
22 nozzle rotation axis
23 direction of radiation
24 sieve
25 cyclone
26 rinsing nozzle
27 discharge channel
28 nozzle holder
29 nozzle head
30 individual nozzles
31 metering belt
32 buffer
33 conveyor belt
34 first stockpile
35 oil separator
36 decanter
37 thickener
38 filter press
39 second stockpile

The invention claimed is:

1. A device for recycling building material containing a base material and a binder, comprising:
a receiving container for containing the building material; and
at least one actuator is arranged on the receiving container and configured to set the building material in motion under simultaneous impact with the high-pressure water jet;
wherein the building material in the receiving container is acted upon by a high-pressure water jet through at least one nozzle for detaching the binder from the base material;
wherein the actuator is designed to set the receiving container in motion; wherein the motion of the receiving container in combination with the high-pressure water jet is designed to fluidize the building material received in the receiving container and to set it in a vortex-like motion.

2. The device according to claim 1, wherein the high-pressure water jet has a water pressure at the at least one nozzle of more than 1000 bar.

3. The device according to claim 1, wherein the at least one nozzle is arranged to be moved laterally in a circulating manner with respect to a radiation direction of the high-pressure water jet.

4. The device according to claim 1, wherein the device is configured for separating detached binder and base material.

5. A method for recycling building material containing a base material and a binder using the device (1) according to claim 1, comprising:
filling building material into a receiving container,
detaching the binder from the base material by impacting the building material in the receiving container with a high-pressure water jet, and
separating the detached binder from the base material.

6. Method according to claim 5, wherein the filling of building material, the detachment of the binder from the base material and the separation of the detached binder from the base material are carried out in several successive passes, the particle size of the base material separated from the binder being reduced with each pass.

7. A device for recycling building material containing a base material and a binder, comprising:
a receiving container for containing the building material, wherein the building material in the receiving container is acted upon by a high-pressure water jet through at least one nozzle for detaching the binder from the base material;
wherein the receiving container is designed as a trough-shaped throughput vibrator.

8. The device according to claim 7, further comprising at least one actuator is arranged on the receiving container, which is designed to set the building material in motion under simultaneous impact with the high-pressure water jet.

9. The device according to claim 8, wherein the high-pressure water jet of the at least one nozzle is directed in such a way that the movement of the building material is supported.

10. The device according to claim 7, wherein the trough-shaped throughput vibrator is designed to trigger a trowalizing movement of the building material in the receiving container.

11. The device according to claim 10, wherein the high-pressure water jet of at least one nozzle is oriented in such a way that the trowalizing movement of the building material is assisted by water power.

12. The device according to claim 7, wherein the at least one nozzle comprises a plurality of nozzles which are arranged along the trough-shaped throughput vibrator, which assist the trowalizing movement of the building material along the trough-shaped throughput vibrator by water power.

13. The device according to claim 7, wherein the at least one nozzle is oriented in such a way that the nozzle sprays at least one high-pressure water jet in the direction of a deepest point of the trough-shaped throughput vibrator.

14. The device according to claim 7, wherein the at least one nozzle comprises a plurality of nozzles which are arranged along the trough-shaped throughput vibrator, each of which is oriented such that the nozzles each spray at least one high-pressure water jet in the direction of a deepest point of the trough-shaped throughput vibrator.

15. A device for recycling building material containing a base material and a binder, comprising:
a receiving container for containing the building material, wherein the building material in the receiving container is acted upon by a high-pressure water jet through at least one nozzle for detaching the binder from the base material;
wherein the at least one nozzle generates a plurality of high-pressure water jets rotating about a nozzle rotation axis, wherein the radiation directions of the rotating high-pressure water jets are aligned parallel to the nozzle rotation axis.

16. A device for recycling building material containing a base material and a binder, comprising:
a receiving container for containing the building material, wherein the building material in the receiving container is acted upon by a high-pressure water jet through at least one nozzle for detaching the binder from the base material, wherein the device is configured for separating detached binder and base material; and
at least one sieve arranged at the bottom of the receiving container and adapted to let through detached binder and water and to retain building material and base material in the receiving container.

17. A device for recycling building material containing a base material and a binder, comprising:
a receiving container for containing the building material;

at least one cyclone for separating detached binder and base material;

wherein the building material in the receiving container is acted upon by a high-pressure water jet through at least one nozzle for detaching the binder from the base material;

wherein the device is configured for separating detached binder and base material.

* * * * *